US009740238B2

(12) United States Patent
Han

(10) Patent No.: US 9,740,238 B2
(45) Date of Patent: Aug. 22, 2017

(54) TABLET STAND APPARATUS

(71) Applicant: Samsung Electronics Co., Ltd, Suwon-si, Gyeonggi-do (KR)

(72) Inventor: Jae-uk Han, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 470 days.

(21) Appl. No.: 14/306,796

(22) Filed: Jun. 17, 2014

(65) Prior Publication Data

US 2015/0055284 A1 Feb. 26, 2015

Related U.S. Application Data

(60) Provisional application No. 61/869,164, filed on Aug. 23, 2013.

(30) Foreign Application Priority Data

Sep. 5, 2013 (KR) .......................... 10-2013-0106687

(51) Int. Cl.
G06F 1/16 (2006.01)
G06F 3/02 (2006.01)
(Continued)

(52) U.S. Cl.
CPC ........... *G06F 1/1626* (2013.01); *F16M 11/00* (2013.01); *F16M 11/38* (2013.01); *F16M 13/00* (2013.01); *G06F 1/1616* (2013.01); *G06F 1/1683* (2013.01); *G06F 3/0227* (2013.01); *G06F 2200/1633* (2013.01)

(58) Field of Classification Search
CPC ................ G06F 1/1683; G06F 1/1626; G06F 2200/1633; G06F 3/0227; G06F 1/1616; F16M 11/00; F16M 11/38; F16M 13/00
See application file for complete search history.

(56) References Cited

U.S. PATENT DOCUMENTS 6,055,705 A * 5/2000 Komatsu ................... E05D 1/02
16/225
6,780,019 B1 8/2004 Ghosh et al.
(Continued)

FOREIGN PATENT DOCUMENTS

KR 2012-0135978 12/2012
WO 2012-160327 11/2012

OTHER PUBLICATIONS

International Search Report and Written Opinion issued in PCT/KR2013/010988 on May 26, 2014.
(Continued)

*Primary Examiner* — Courtney Smith
*Assistant Examiner* — Christopher L Augustin
(74) *Attorney, Agent, or Firm* — Staas & Halsey LLP

(57) ABSTRACT

A tablet stand apparatus includes a cover part detachably mounted with a tablet, a keyboard part configured to receive a user command to control the tablet mounted on the cover part, a flexible hinge of which one end portion is fixed to the cover part, and the other end portion is fixed to the keyboard part, to foldably interconnect the cover part and the keyboard part, and a supporter of which one end portion is connected to the keyboard part and configured to support the cover part to stand at a preset angle.

19 Claims, 17 Drawing Sheets

(51) Int. Cl.
  *F16M 11/00*  (2006.01)
  *F16M 11/38*  (2006.01)
  *F16M 13/00*  (2006.01)

(56) References Cited

U.S. PATENT DOCUMENTS

| | | | | |
|---|---|---|---|---|
| 8,807,333 | B1* | 8/2014 | Cooper | A45C 11/00 |
| | | | | 206/320 |
| 2004/0005184 | A1* | 1/2004 | Kim | G06F 1/1618 |
| | | | | 400/472 |
| 2004/0160428 | A1* | 8/2004 | Ghosh | G06F 1/1616 |
| | | | | 345/179 |
| 2010/0144406 | A1* | 6/2010 | Ozawa | G06F 1/1618 |
| | | | | 455/575.3 |
| 2012/0103921 | A1* | 5/2012 | Liu | F16M 13/00 |
| | | | | 211/26 |
| 2012/0140396 | A1 | 6/2012 | Zeliff et al. | |
| 2012/0211377 | A1* | 8/2012 | Sajid | G06F 1/1628 |
| | | | | 206/216 |
| 2012/0327580 | A1* | 12/2012 | Gengler | G06F 1/1626 |
| | | | | 361/679.09 |
| 2013/0016467 | A1* | 1/2013 | Ku | F16M 11/10 |
| | | | | 361/679.08 |
| 2013/0214661 | A1 | 8/2013 | McBroom | |
| 2013/0229386 | A1* | 9/2013 | Bathiche | G06F 1/1654 |
| | | | | 345/175 |
| 2014/0191973 | A1* | 7/2014 | Zellers | G06F 3/0414 |
| | | | | 345/168 |
| 2014/0237548 | A1* | 8/2014 | Hassan | G06F 21/31 |
| | | | | 726/3 |

OTHER PUBLICATIONS

Samsung Premiere 2013 Galaxy & ATIV, London, Jun. 20, 2013, Livestreaming online; http://www.youtube.com/watch?feature=player_detailpage&v=xtisk0-mY_0.

* cited by examiner

TABLET STAND APPARATUS

CROSS-REFERENCE TO RELATED APPLICATIONS

This application claims priority from U.S. Provisional Application No. 61/869,164 filed on Aug. 23, 2013, in the United State Patents and Trademark Office, and Korean Patent Application No. 10-2013-0106687, filed on Sep. 5, 2013, in the Korean Intellectual Property Office, the disclosure of which is incorporated herein by reference in its entirety.

BACKGROUND OF THE INVENTION

1. Field of the Invention

Apparatuses and methods consistent with exemplary embodiments relate to a tablet stand apparatus, and more particularly, to a book cover type tablet stand apparatus including a keyboard.

2. Description of the Related Art

Tablets are an apparatus in which portability of a personal digital assistant (PDA) and functions of a laptop computer are mixed, and the tablets are a mobile apparatus which embeds a touch screen therein to execute a program embedded therein using a finger or a touch pen, and is web-accessible anywhere through a wireless communication module. The tablets may perform jobs for generating contents such as word processing tasks like general personal computers (PCs), and display multimedia data such as a moving image, music, or a game.

The tablets are mostly mounted on book cover type protection cases to be used. The protection cases for the tablet in the related art may be opened like a book to use the tablet, and the tablets include a separate keyboard configured to receive a user input and control the tablet.

The protection case for the tablet includes a stand configured to provide for the tablet to stand upright and to be used in this upright position. When the tablet is set in an upright standing state and then a user touches a touch screen of the tablet, the tablet is shaken substantially since such a stand does not provide sufficient support for the tablet to remain sturdy in the upright position. Therefore, a touch input is often made incorrectly, and thus product usability of the protection case for the tablet is significantly degraded.

SUMMARY OF THE INVENTION

Exemplary embodiments of the present inventive concept may overcome the above described disadvantages and other disadvantages which are not described above. However, it is understood that exemplary embodiments herein are not limited to overcoming the disadvantages described above, and can provide additional features and utilities as can be understood by those of ordinary skill in the art.

Exemplary embodiments of the present inventive concept provide a tablet stand apparatus which rigidly supports a cover part of a tablet so as not to be shaken when a touch is input through a touch screen of a tablet.

Additional features and utilities of the present general inventive concept will be set forth in part in the description which follows and, in part, will be obvious from the description, or may be learned by practice of the general inventive concept.

Exemplary embodiments of the present inventive concept provide a tablet stand apparatus. The tablet stand apparatus may include: a cover part detachably mounted with a tablet; a keyboard part configured to receive a user command to control the tablet mounted on the cover part; a flexible hinge of which one end portion is fixed to the cover part, and the other end portion is fixed to the keyboard part, to foldably interconnect the cover part and the keyboard part; and a supporter of which one end portion is connected to the keyboard part and configured to support the cover part to stand at a preset angle.

The cover part may press the flexible hinge to form tension in the flexible hinge when the cover part stands at the preset angle. At this time, a pressure part curved toward an inner side of the cover part may be formed in the cover part so that a portion of the cover part to which one end portion of the flexible hinge is connected presses one side surface of the flexible hinge.

The cover part may include a first fixing member configured to fix the one end portion of the flexible hinge to the cover part.

The first fixing member may be fused with a plurality of protrusions of the cover part, which pass through the one end portion of the flexible hinge.

An outer contour of the first fixing member may be located in the inner side of an outer contour of the pressure part.

The flexible hinge may include a flexible synthetic resin material, for example, a polyurethane resin.

The one end portion of the supporter may be fixed to the keyboard part. The other end portion of the flexible hinge may be fixed to the keyboard part together with the one end portion of the supporter by a second fixing member. The second fixing member may be fused with a plurality of protrusions of the keyboard part, which pass through the other end portion of the flexible hinge and the one end portion of the supporter. The other end portion of the flexible hinge may extend to the one end portion of the supporter to be formed in one body with the supporter.

The one end portion of the supporter may be fixed to the cover part. The cover part may include a first fixing member configured to fix the one end portion of the flexible hinge to the cover part. The first fixing member may be fused with a plurality of protrusions of the cover part, which pass through the one end portion of the flexible hinge and the one end portion of the supporter.

A plurality of protrusions which pass through the other end portion of the flexible hinge may be formed in the keyboard part, and the other end portion of the flexible hinge may be fixed to the keyboard part by a second fixing member fused with the plurality of protrusions of the keyboard part.

The one end portion of the flexible hinge may extend to the one end portion of the supporter to be formed in one body with the supporter.

The supporter may be detachably attached to an outer surface of the cover part by magnetic force.

The supporter is configured to be bendable in a multistage manner. The supporter may include first to third sections sequentially disposed from the one end portion thereof to the other end portion thereof and mutually bent. A plurality of magnets may be disposed in the third section corresponding to the other end portion of the supporter among the first to third sections, and the cover part may include first to third magnetic materials disposed in locations corresponding to the first to third sections of the supporter.

The third section may include a fourth magnetic material configured to reinforce a magnetic force of the plurality of magnets.

The cover part may include a plurality of magnets, and the plurality of magnets provided in the cover part may be disposed together with at least one of the first to third magnetic materials.

The cover part may include a plurality of magnets attached and fixed to the second and third magnetic materials.

A plurality of magnets attached to the third magnetic material of the cover part and the plurality of magnets embedded in the third section of the supporter may be disposed in locations corresponding to each other.

Each of the first to third sections may embed a reinforcement plate configured to maintain a shape thereof.

A groove into which the supporter is inserted may be formed in an outer surface of the cover part.

The supporter may include an inner skin and an outer skin having areas corresponding to each other, and the inner skin and the outer skin may include a flexible synthetic resin material. The inner skin and the outer skin may include polyurethane.

The keyboard part may include a communication module configured to perform wireless communication with the tablet.

The keyboard part may further include an interface unit to which the tablet is connected in a wired manner. The interface unit may include a flexible wire extending from the keyboard part and disposed along an inner side of the flexible hinge, and a connection terminal connected to the flexible wire and disposed in an outer side of the flexible hinge.

The cover part may include a hard case formed of a synthetic resin material. The hard case may be formed of an epoxy resin.

In an exemplary embodiment, the supporter is detachably attached to an outer surface of the cover part by a magnetic force.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
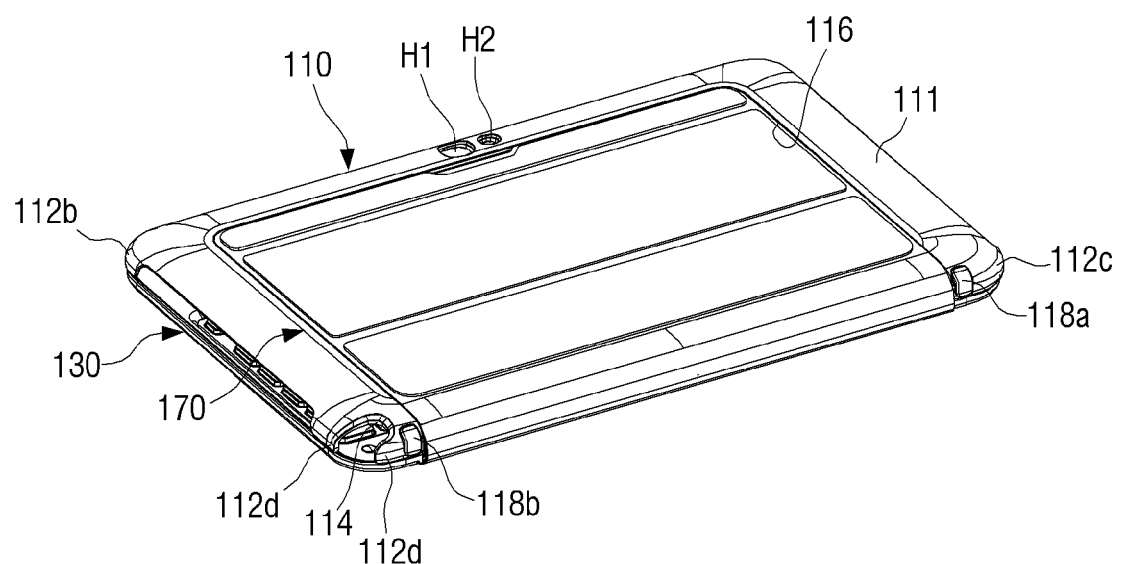
FIG. 1 is a perspective view illustrating a first usage mode of a tablet stand apparatus according to an exemplary embodiment.

Hereinafter, exemplary embodiments will be described in more detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 2:
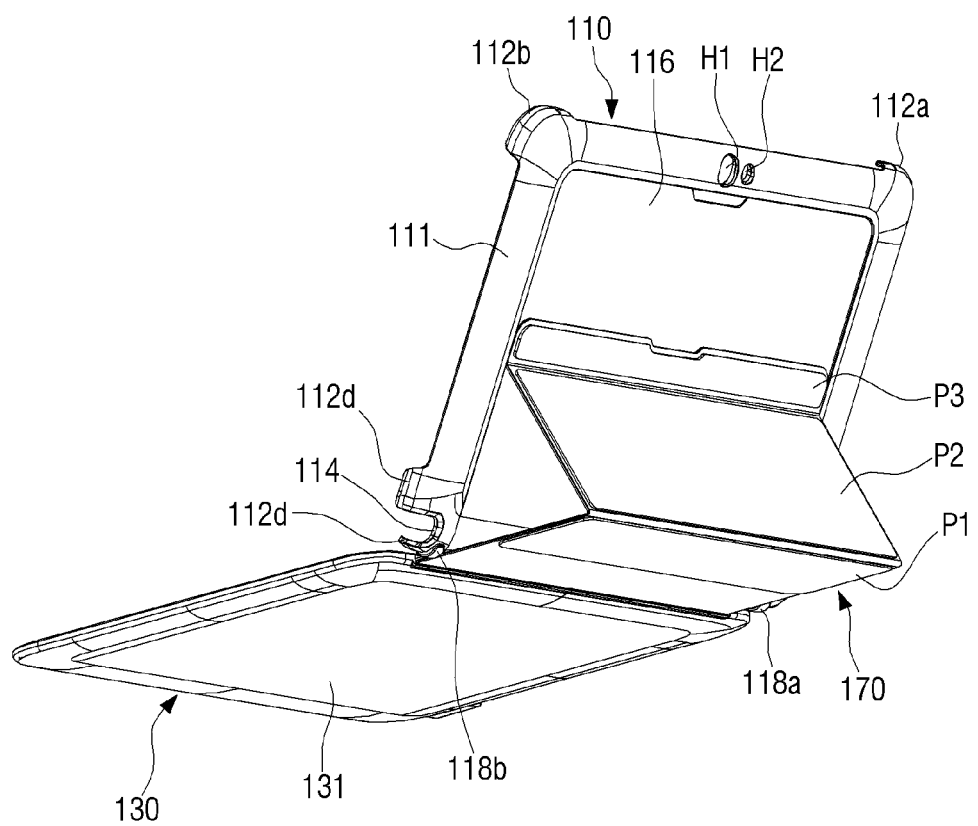
FIGS. 2 and 3 are perspective views illustrating a second usage mode of a tablet stand apparatus according to an exemplary embodiment.
Figure 3:
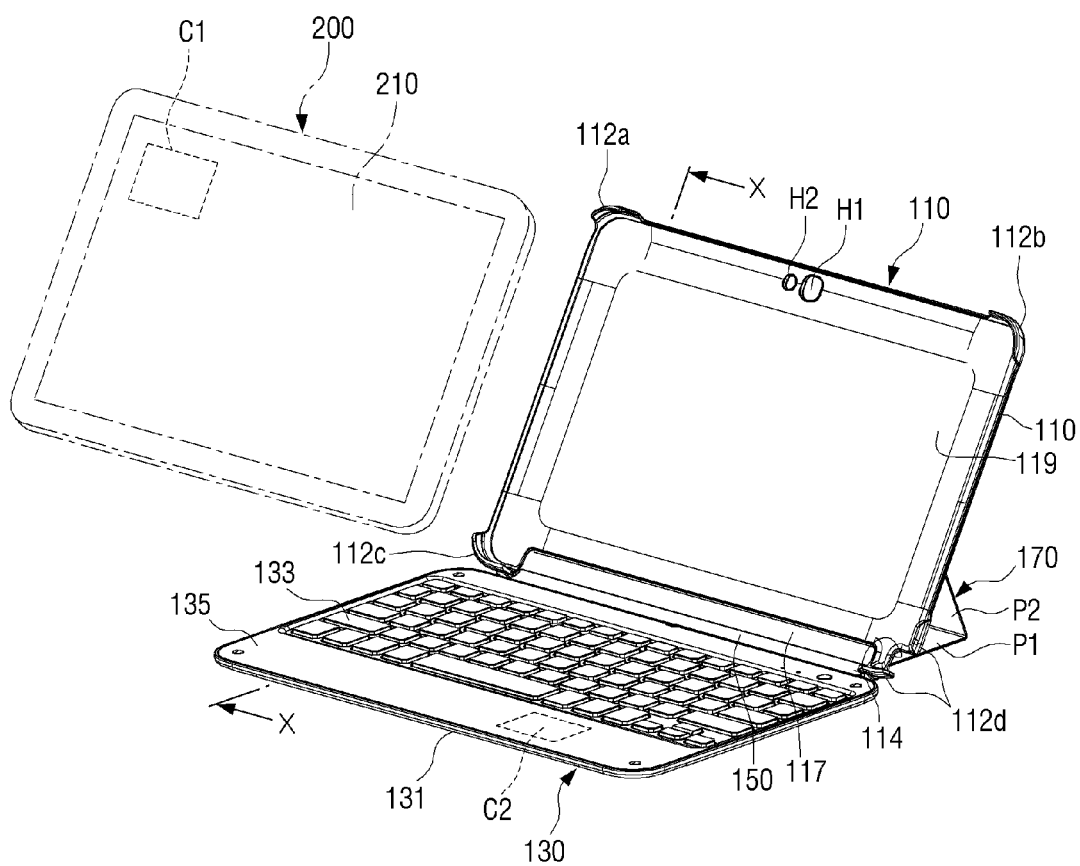
Figure 4:
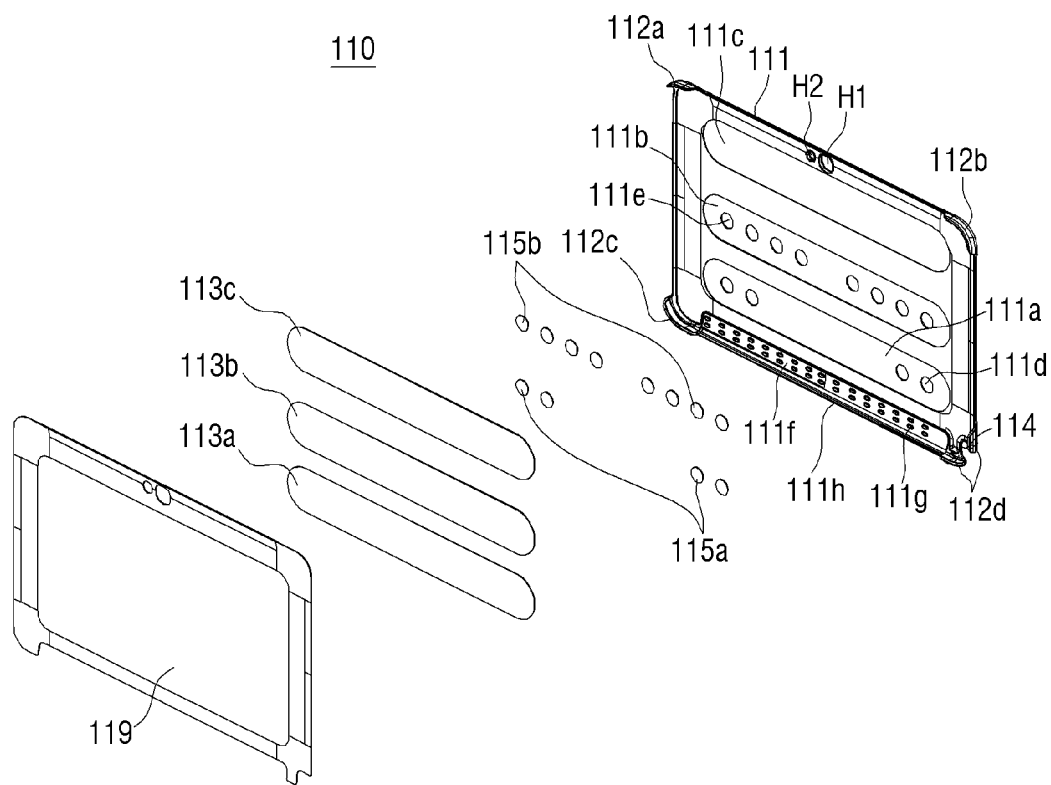
FIG. 4 is an exploded perspective view illustrating a cover part illustrated in FIG. 3.

Referring to FIGS. 1 to 3, a tablet stand apparatus 100 according to an exemplary embodiment includes a cover part 110 detachably mounted with a tablet 200, a keyboard part 130 configured to receive a user command to control the tablet 200 mounted on the cover part 110, a flexible hinge 150 configured to foldably interconnect the cover part 110 and the keyboard part 130, and a supporter 170 configured to support the cover part 130 to stand at a preset angle.

Referring to FIGS. 1 to 4, the cover part 110 includes a hard case 111, first to third magnetic materials 113a, 113b, and 113c, a plurality of first magnets 115a, a plurality of second magnets 115b, a first fixing member 117, first and second slip preventing members 118a and 118b, and an inner finishing material 119.

The hard case 111 may be formed of a material having a predetermined strength to protect the tablet 200 from an external shock. For example, the hard case 111 may be formed of a synthetic resin material having a predetermined strength and easy to be molded, such as an epoxy resin.

First to fourth coupling parts 112a, 112b, 112c, and 112d are formed to protrude from the hard case so that four corners of the tablet (see 200 of FIG. 3) can be snap-coupled and the tablet 200 can be detachably mounted on the hard case 111.

The first to fourth coupling parts 112a, 112b, 112c, and 112d may have different shapes. For example, a cutting portion 114 may be formed in the fourth coupling part 112d corresponding to a location into which a touch pen (not shown) provided in the tablet 200 is inserted. The cutting portion 114 may be formed in a size in which the touch pen may pass through.

First to third placing grooves 111a, 111b, and 111c are formed in an inner surface of the hard case 111 facing the keyboard part 130 when the hard case 111 is folded (see FIG. 1).

The placing grooves 111a, 111b, and 111c have a predetermined length, and are disposed at an interval along the hard case 111. The placing grooves 111a, 111b, and 111c may be disposed to correspond to first to third sections (see P1, P2, and P3 of FIG. 9) of the supporter 170.

The first placing groove 111a is disposed close to one side of the hard case 111 to which the flexible hinge 150 is connected. A plurality of first insertion grooves 111d into which the plurality of first magnets 115a are inserted are provided in the first placing groove 111a. The plurality of first insertion grooves 111d are partially disposed in sets of two at both end portions of the first placing groove 111a. At this time, the number and setting locations of the first insertion grooves 111d are not limited thereto, and may be properly changed according to a size of the hard case.

The second placing groove 111b is disposed between the first and third placing grooves 111a and 111c. A plurality of second insertion grooves 111e into which the plurality of second magnets 115b are inserted are provided in the second placing groove 111b. The number of second insertion grooves 111e is larger than the number of first insertion grooves 111d.

Figure 10:
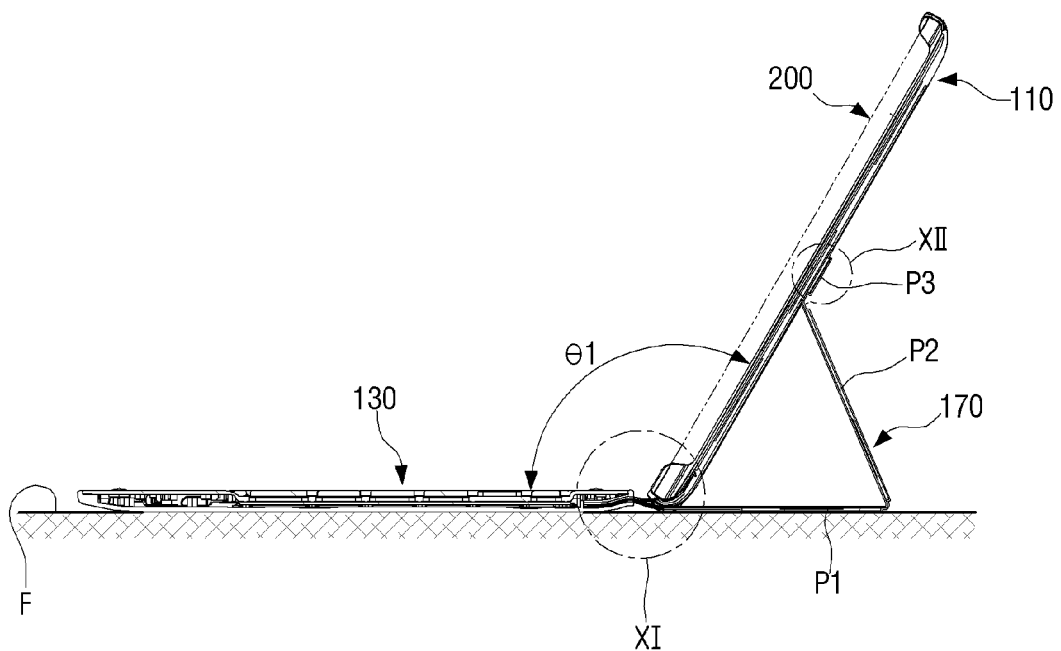
FIG. 10 is a cross-sectional view illustrating a tablet stand apparatus taken along line X-X of FIG. 3.

The number of second insertion grooves 111e may be equal to the number of third magnets 177 disposed in the third section P3 of the supporter 170, and the plurality of second insertion grooves 111e may be disposed to correspond to an arrangement of the plurality of third magnets 177. Therefore, the third section P3 of the supporter 170 may be strongly attached to an outer surface of the hard case 111 to stably support a weight of the tablet 200 mounted on the hard case 111 and not to be detached from the outer surface of the hard case 111 by touch force of a user (force applied to a touch screen 210 when the user touches the touch screen 210) when the hard case 111 turns at a preset first angle θ1 (approximately 120° to a direction in which the hard case 111 is unfolded so that a first usage mode of the stand apparatus 100, in which the hard case 111 is folded to the keyboard part 130 as illustrated in FIG. 1, is switched to a second usage mode of the stand apparatus 100 as illustrated in FIG. 10) and obliquely stands.

First and second exposing holes H1 and H2 (see FIGS. 1 to 4) are formed in the hard case 111 to expose a lens (not shown) and a light-emitting diode (LED) for illumination (not shown) installed in a rear of the tablet 200 when the tablet 200 is mounted on the cover part 110. At this time, locations of the first and second holes H1 and H2 may be set to correspond to locations of the lens and the LED for illumination of the tablet 200.

Figure 11:
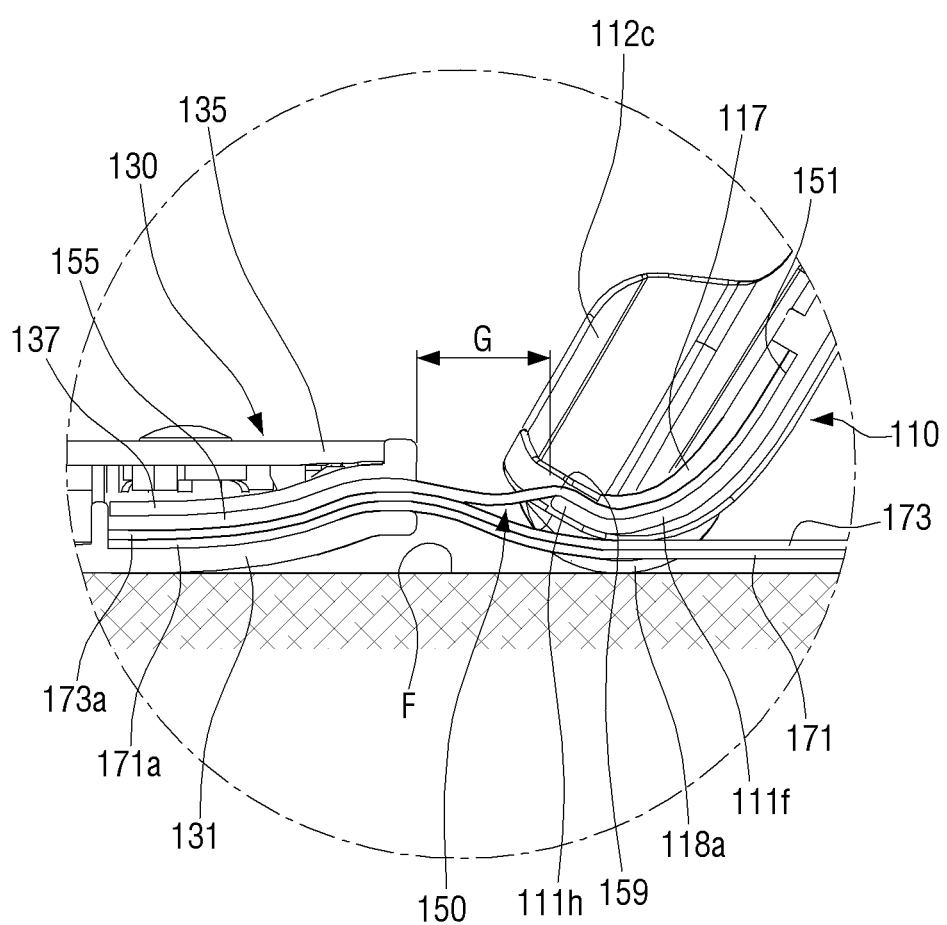
FIG. 11 is an enlarged view illustrating an XI portion of FIG. 10.

A pressure part 111h curved toward the inner side of the cover part 110 is formed in an edge of one end portion 111f of the hard case 111. The pressure part 111h pressurizes one lateral surface of the flexible hinge 150 (that is, an opposite lateral surface of the flexible hinge 150 in contact with the first fixing member 117) to form predetermined tension in the flexible hinge 150 as illustrated in FIG. 11 when the cover part 110 stands at the preset angle as illustrated in FIG. 10. The process of pressurizing the flexible hinge 150 by the pressure part 111h will be described in detail later.

The first to third magnetic materials 113a, 113b, and 113c have a plate shape having a predetermined thickness, and are inserted into the first to third placing grooves 111a, 111b, and 111c.

The first magnetic material 113a functions as a yoke configured to expand a range affected by magnetic force of the plurality of first magnets 115a and increase an intensity of the magnetic force. Therefore, when the supporter 170 is inserted into a groove 116 formed in an outer surface of the hard case 111 in the first usage mode of the stand apparatus 100, as illustrated in FIGS. 1 and 2, a strong attractive force is formed between the plurality of first magnets 115a and a fourth magnetic material 175a installed in the first section P1 of the supporter 170 due to the magnetic force increased through the first magnetic material 113a. Accordingly, the first section P1 of the supporter 170 may be stably fixed to the outer surface of the hard case 111.

The second magnetic material 113b functions as a yoke configured to expand a range affected by magnetic force of the plurality of second magnets 115b and increase an intensity of the magnetic force. Therefore, in the first usage mode (see FIG. 1) of the stand apparatus 100, strong attractive force is formed between the plurality of second magnets 115b and a fifth magnetic material 175b installed in the second section P2 of the supporter 170, and thus the section P2 of the supporter 170 may be stably fixed to the outer surface of the hard case 111.

In the second usage mode (see FIG. 2) of the stand apparatus 100, a strong attractive force may be formed between the plurality of second magnets 115b (see FIG. 4) and a plurality of magnets 177 (see FIG. 8) installed in the third section P3 of the supporter 170 through the second magnetic material 113b. Therefore, the supporter 170 may stably support the cover part 110 which obliquely stands in a state in which the tablet 200 is mounted thereon.

As described above, the pluralities of first and second magnets 115a and 115b are inserted into first and second insertion grooves 111d and 111e, respectively. At this time, the number and arrangement of the second magnets 115b may be set to correspond to those of the third magnets 177 disposed in the third section P3 of the supporter 170.

Figure 5:
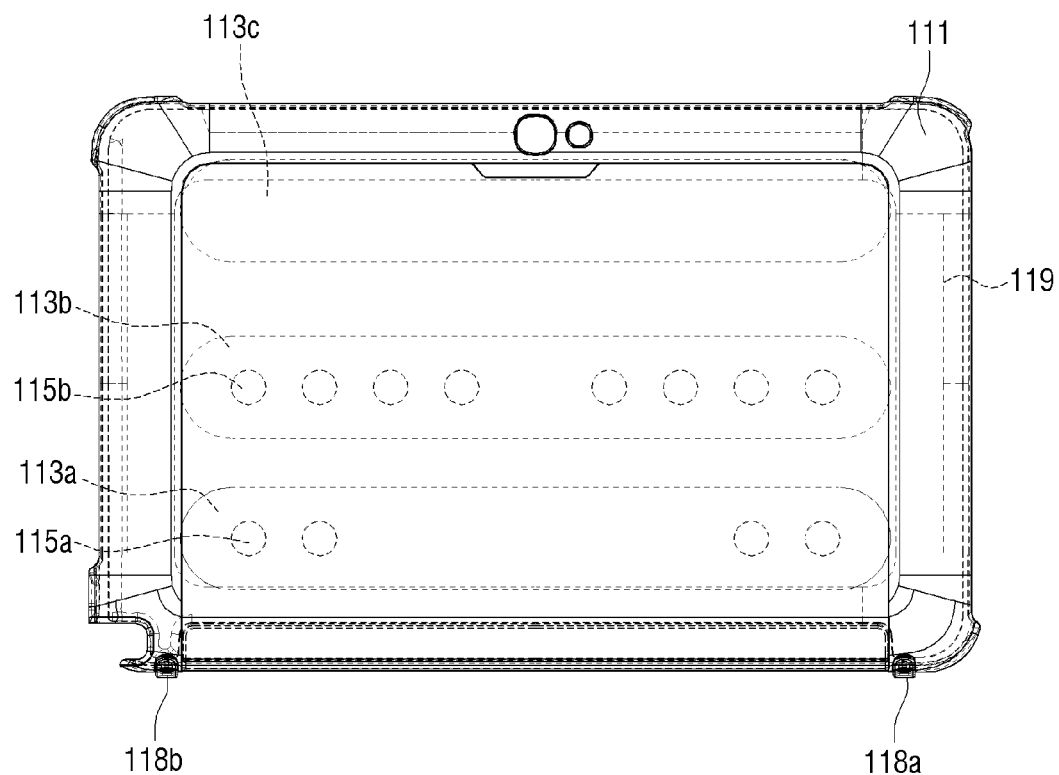
FIG. 5 is a schematic diagram illustrating an arrangement state of a plurality of magnetic materials and a plurality of magnets installed inside the cover part of FIG. 4.

The above-described first to third magnetic materials 113a, 113b, and 113c are sequentially disposed from a lower side of the hard case to an upper side thereof at a predetermined interval as illustrated in FIG. 5.

Figure 6:
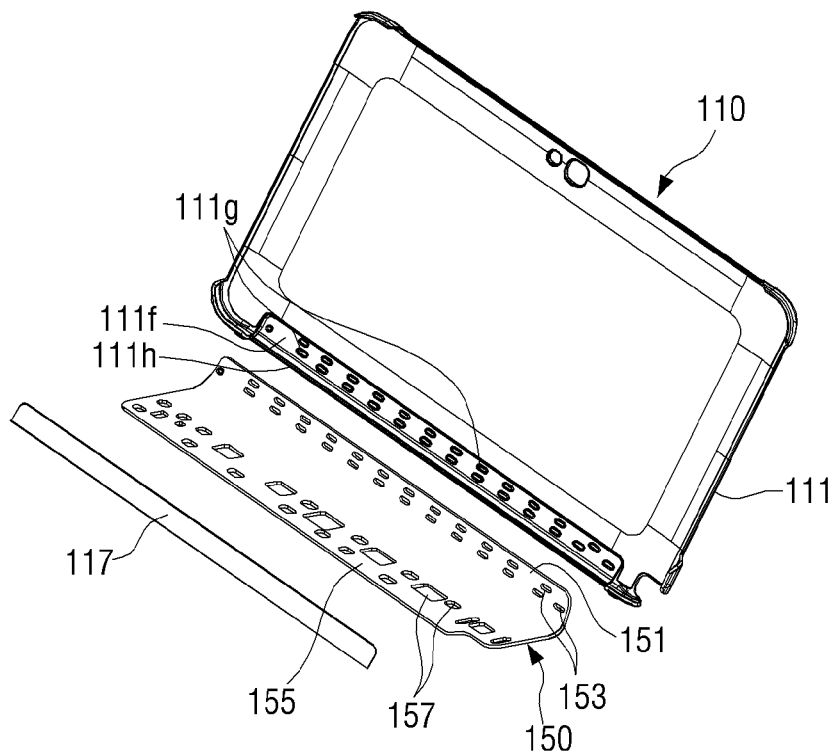
FIG. 6 is an exploded perspective view illustrating a fixing structure between a cover part and a flexible hinge.

The first fixing member 117 fixes one end portion 151 of the flexible hinge 150 to the hard case 111 (see, for example, FIG. 6). At this time, the first fixing member 117 is fixed to the hard case 111 together with a plurality of protrusions 111g protruding from one end portion 111f of the hard case 111 through a fusing (for example, ultrasonic fusing) process in a state in which the first fixing member 117 is placed on the one end portion 151 of the flexible hinge 150. Therefore, the first fixing member 117 may rigidly fix the one end portion 151 of the flexible hinge 150 to the hard case 111, as illustrated, for example, in FIG. 7.

The first fixing member 117 may be formed of the same material as the hard case 111 to enable the ultrasonic fusion, that is, a synthetic resin material (for example, an epoxy resin).

The first fixing member 117 may be formed to have the same curvature as the end portion 111f of the hard case 111 and may tightly fix the one end portion 151 of the flexible hinge 150 to the one end portion 111f of the hard case 111.

Further, as illustrated in FIG. 11, the outer contour (or the end portion) of the first fixing member 117 is located inwardly more than the outer contour (or end portion) of the pressure part 111*h* of the hard case 111. This is considered to smoothly switch the stand apparatus 100 to the first to third usage modes and simultaneously minimizes a length (a G portion indicated in FIG. 11) of the flexible hinge 150.

The first slip preventing members 118*a* and 118*b* are fixed and coupled to an outer side of the third and fourth coupling parts 112*c* and 112*d*, respectively, of the hard case (see FIG. 1).

The first and second slip preventing members 118*a* and 118*b* have a thickness to be smoothly placed on a floor F in the second usage mode of the stand apparatus 100 (see FIG. 10). Therefore, when the user uses the keyboard part 130, the first and second slip preventing members 118*a* and 118*b* prevent movement of the stand apparatus 100 such as back sliding so that the user may stably and securely use the keyboard part 130.

The first and second slip preventing members 118*a* and 118*b* may include a rubber material to maximize a friction force with a surface (i.e., the floor) and to have predetermined elastic force.

The inner finishing sheet 119 may be attached to the inner side of the hard case 111 to prevent the first to third magnetic materials 113*a*, 113*b*, and 113*c* and the pluralities of first and second magnets 115*a* and 115*b* from being detached from the hard case 111 (see FIG. 5).

The keyboard part 130 has substantially a similar size to the cover part 110, and includes a wireless communication module C2 (see FIG. 3) for wireless communication (for example, Bluetooth or WiFi) with a wireless communication module C1 embedded in the tablet 200, disposed therein to control the tablet 200 mounted on the cover part 110. A location of the wireless communication module C2 is not limited to the location illustrated in FIG. 3, and may be properly changed according to a design of the keyboard part 130.

The keyboard part 130, as illustrated in FIG. 3, includes a bottom case 131, a control circuit (not shown) and a plurality of key buttons 133 installed in the bottom case 131, and a top case 135 mounted on the bottom case 131.

Figure 7:
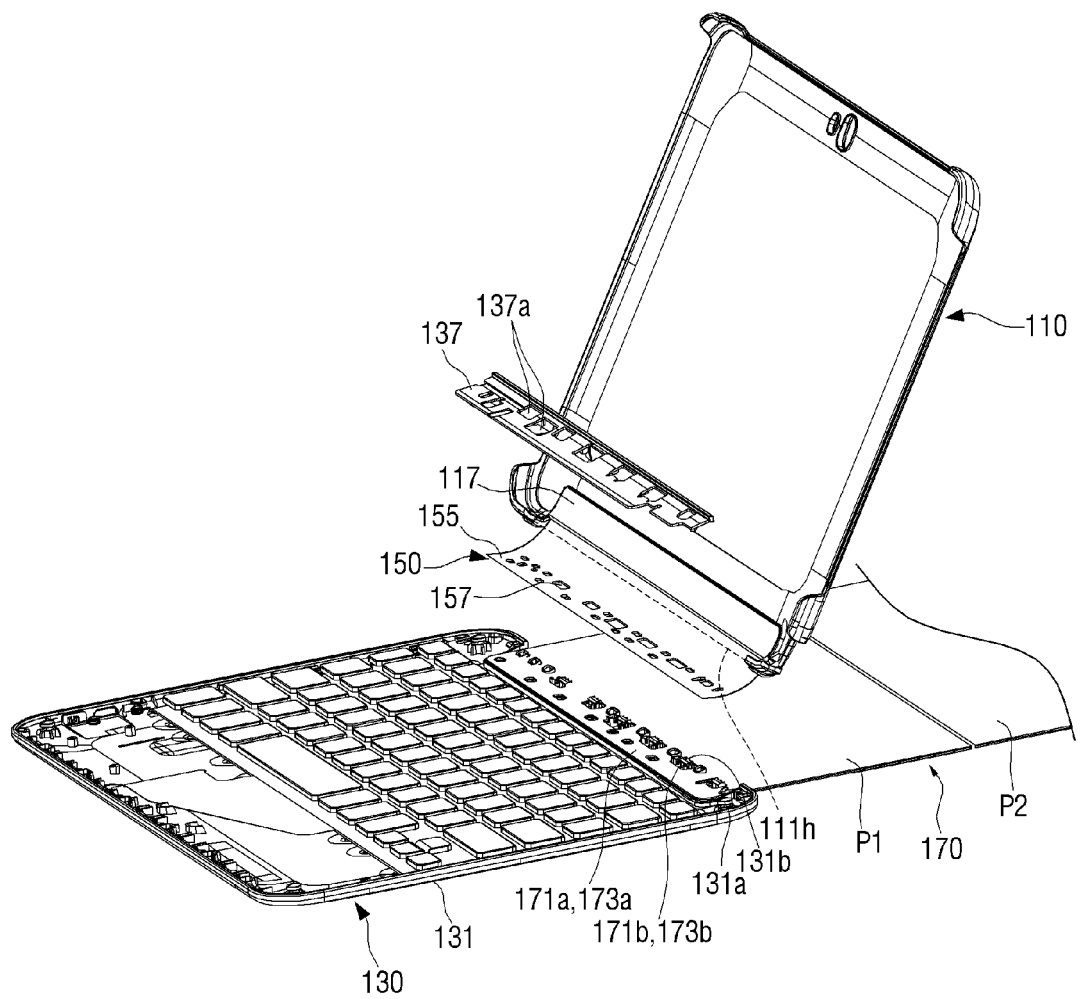
FIG. 7 is an exploded perspective view illustrating a fixing structure among a supporter, a keyboard part, and a flexible hinge.

As illustrated in FIG. 7, the keyboard part 130 includes a second fixing member 137 configured to fix one end portions 171*a* and 173*a* of the support 170 and the other end portion 155 of the flexible hinge 150 to one end portion 131*a* of the bottom case 131.

A plurality of through holes 137*a*, through which the plurality of protrusions 131*b* protruding from the bottom case 131 pass, are formed in the second fixing member 137. The second fixing member 137 is covered with the top case 135 in a state in which the second fixing member 137 is placed on a top surface of the other end portion 155 of the flexible hinge 150. In this state, the top case 135 is fused with the plurality of protrusions 131*b* of the bottom case 131 through a fusing (for example, ultrasonic fusing) process. At this time, the second fixing member 137 may be formed to have the same curvature as the one end portions 171*a* and 173*a* of the supporter 170 and may tightly fix the other end portion 155 of the flexible hinge 150 to the bottom case 131.

The flexible hinge 150 interconnects the cover part 110 and the keyboard part 130 in a folding manner. Although not shown, the flexible hinge 150 may be formed by mutually adhering an inner skin and an outer skin. To ensure flexibility of the flexible hinge 150, the inner and outer skins may be mutually adhered by applying a single hot melt provided on only one of any of the inner and outer skins.

Figure 13:
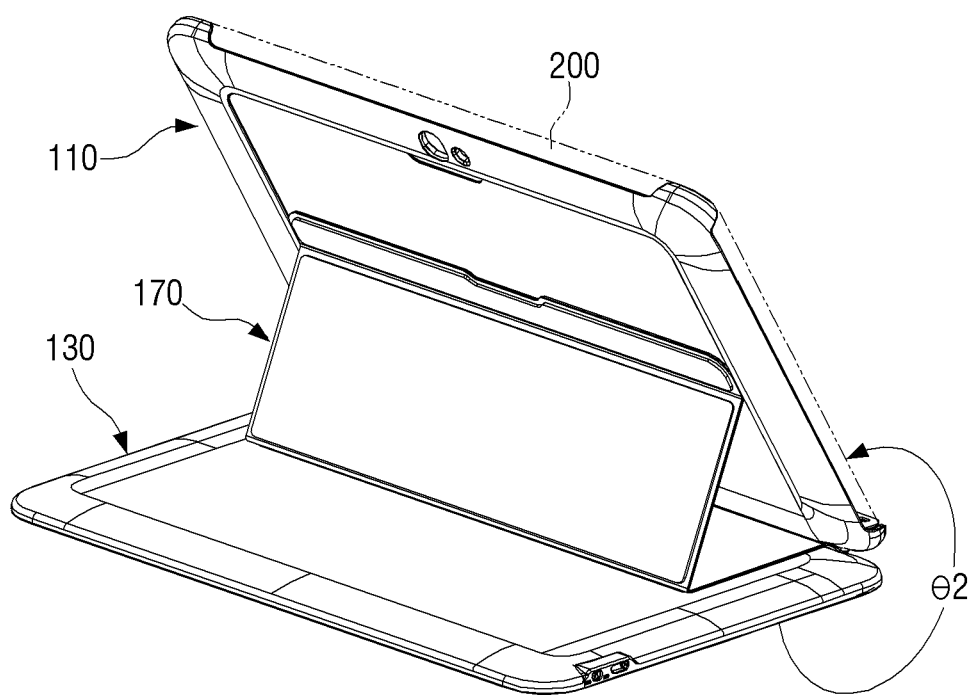
FIG. 13 is a perspective view illustrating a third usage mode of a tablet stand apparatus according to an exemplary embodiment.

The flexible hinge 150 may be formed of a flexible synthetic resin material, for example, a polyurethane resin so that the stand apparatus 100 may be used in the first usage mode (see FIG. 1), the second usage mode (see FIG. 10), and the third usage mode (see FIG. 13).

When the flexible hinge 150 is formed of a polyurethane resin, the flexible hinge 150 may have elasticity. When the elasticity of the flexible hinge 150 is used, a predetermined tension is maintained in the flexible hinge 150 in the second usage mode (see FIG. 10), and the movement of the cover part 110 by touch force generated when the user touches the touch screen 210 of the tablet 200 is minimized, and as a result the cover part 110 may be stably maintained.

As illustrated in FIG. 6, in the flexible hinge 150 having a predetermined length, a plurality of first through holes 153 are formed in the one end portion 151 and a plurality of second through holes 157 are formed in the other end portion 155.

The plurality of protrusions 111*g* protruding from the one end portion 111*f* of the hard case 111 pass through the plurality of first through holes 153, and the plurality of protrusions 131*b* protruding from the one end portion 131*a* of the bottom case 131 pass through the plurality of second through holes 157.

The flexible hinge 150 has a simple structure as compared with a complex mechanical hinge in the related art, and thus it is easy to fabricate and maintain the flexible hinge 150.

Figure 8:
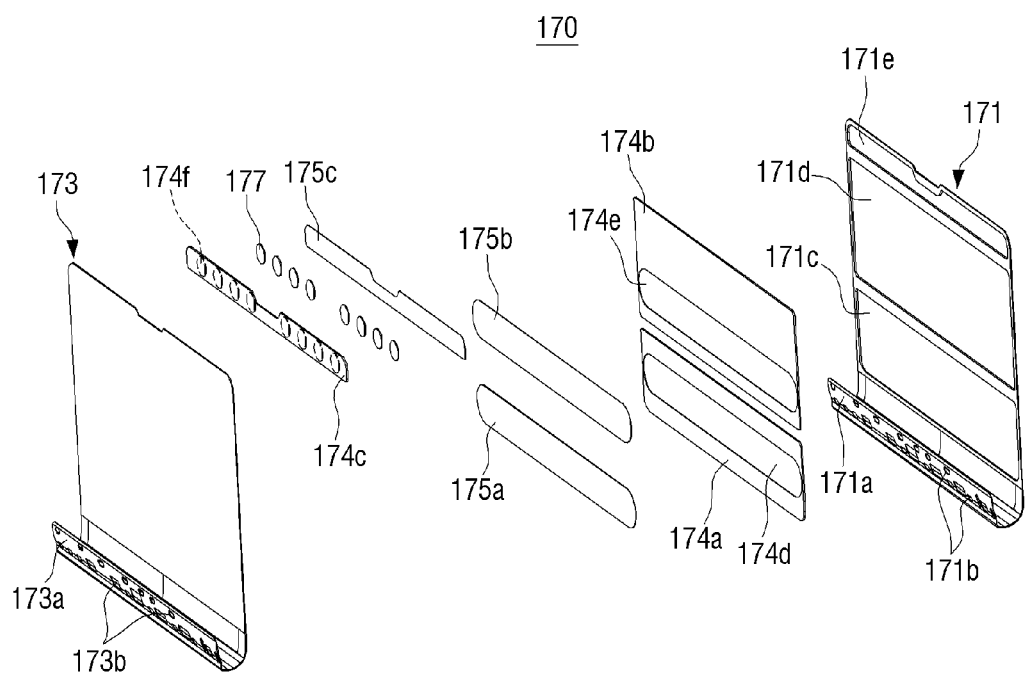
FIG. 8 is an exploded perspective view illustrating a supporter illustrated in FIG. 1.

Referring to FIG. 8, the supporter 170 includes an outer skin 171 and an inner skin 173 which are adhesively combined with each other and have substantially the same size. At this time, the outer skin 171 and the inner skin 173 are mutually attached through a predetermined adhesive.

The supporter 170 includes first to third reinforcement plates 174*a*, 174*b*, and 174*c*, the fourth to sixth magnetic materials 175*a*, 175*b*, and 175*c*, and the plurality of third magnets 177 disposed between the outer skin 171 and the inner skin 173.

The supporter 170 may be formed of a flexible material, for example, a synthetic resin material such as a polyurethane resin. The supporter 170 is partitioned into the first to third sections P1, P2, and P3 sequentially foldable from a side to which the flexible hinge 150 is fixed.

The one end portions 171*a* and 173*a* of the support 170 which extend to be fixed to the keyboard part 130 are formed in the one end portion of the first section P1. A plurality of through holes 171*b* and 173*b*, through which the plurality of protrusions 131*a* formed in the bottom case 131 of the keyboard part 130 pass, are formed in the extension portions 171*a* and 173*a*, respectively.

The first reinforcement plate 174*a* and the fourth magnet material 175*a* are disposed in the first section P1. The first reinforcement plate 174*a* maintains the outer skin 171 and the inner skin 173 having flexibility to be flat and is inserted into a first groove 171*c* formed in the outer skin 171. The fourth magnetic material 175*a* may attach the first section P1 to the outer surface of the cover part 110 by an attractive force formed between the fourth magnetic material 175*a* and the plurality of first magnets 115*a* disposed in the cover part 110 in the first usage mode of the stand apparatus 100.

The second reinforcement plate 174*b* and the fifth magnetic material 175*b* are disposed in the second section P2. Like the first reinforcement plate 174*a*, the second reinforcement plate 174*b* maintains the outer skin 171 and the inner skin 173 having flexibility to be flat. The second reinforcement plate 174*b* is inserted into a second groove 171*d* formed in the outer skin 171. The fifth magnetic material 175*b* may attach the second section P2 to the outer surface of the cover part 110 by an attractive force formed between the fifth magnetic material 175*b* and the plurality of second magnets 115*b* disposed in the cover part 110 in the first usage mode of the stand apparatus 100.

The third reinforcement plate 174*c*, the sixth magnetic material 175*c*, and the plurality of third magnets 177 are disposed in the third section P3. Like the first and second reinforcement plates 174*a* and 174*b*, the third reinforcement plate 174*c* maintains the outer skin 171 and the inner skin 173 having flexibility to be flat and is inserted into a third groove 171*e* formed in the outer skin 171 together with the sixth magnetic material 175*c* in a stacking manner. At this time, the sixth magnetic material 175*c* is disposed in a side of the outer skin 171, and the third reinforcement plate 174*c* is disposed in a side of the inner skin 173.

Figure 9:
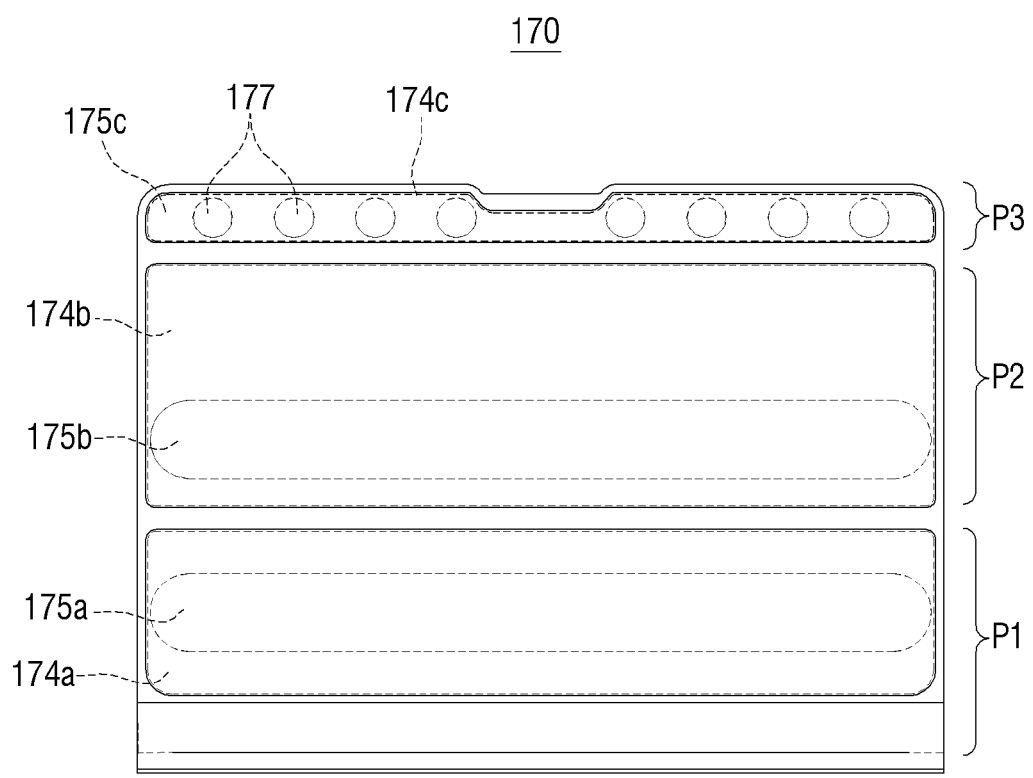
FIG. 9 is a schematic diagram illustrating an arrangement state of a plurality of magnetic materials and a plurality of magnets installed inside the supporter illustrated in FIG. 8.

The plurality of third magnets 177 are inserted into a plurality of insertion grooves 174*f* formed in the third reinforcement plate 174*c*. The plurality of third magnets 177 are disposed at a predetermined interval along the sixth magnetic material 175*c* as illustrated in FIG. 9, and the arrangement of the plurality of third magnets 177 corresponds to the arrangement of the plurality of second magnet 115*b* of the cover part 110 as illustrated in FIG. 5.

Hereinafter, an operation of the tablet stand apparatus 100 having the configuration according to the first to third usage modes according to an exemplary embodiment will be described.

Referring to FIG. 1, the first usage mode of the stand apparatus 100 is a folded mode in which the cover part 110 faces the keyboard part 130 so that the tablet is not being used, but instead is in a stored position.

At this time, the supporter 170 is not used, and the first to third sections P1, P2, and P3 are inserted into the groove 116 formed in the outer surface of the hard case 111 in an unfolded manner. The supporter 170 is strongly attached to the outer surface of the hard case 111 by attractive force formed between the first to third magnets 115*a*, 115*b*, and 177 and the first to sixth magnetic materials 113*a*, 113*b*, 113*c*, 175*a*, 175*b*, and 175*c*.

Referring to FIG. 10, the second usage mode of the stand apparatus 100 is a mode in which the user may simultaneously use the tablet 200 and the keyboard part 130. At this time, the cover part 110 is supported by the supporter 170 to obliquely stand at a first angle θ1. The first angle θ1 is, for example, an angle in which the cover part 110 in the first usage mode is rotated to be disposed at about 120° away from the keyboard part 130.

At this time, since the first fixing member 117 fixes a top surface of the flexible hinge 150, a portion 159 of the flexible hinge 150 is pressed upward (for example, an opposite direction of the floor F) by the pressure part 111*h* of the cover part 110 as illustrated in FIG. 11. Therefore, the flexible hinge 150 is pressed by the first fixing member 117 and the pressure part 111*h* to have a predetermined tension.

The tension formed in the flexible hinge 150 maintains the flexible hinge 150 having an elasticity to be tensed, and thus minimizes the movement of the cover part 110 back and forth by a touch force generated when the user touches the touch screen 210 of the tablet 200, so that the user may stably use the tablet 200.

In the second usage mode, the supporter 170 is maintained in a multistage-bent manner, and the third section P3 of the supporter 170 may be attached and fixed substantially to a central portion (a portion in which the plurality of second magnets 115*b* are located) of the cover part 110.

Figure 12:
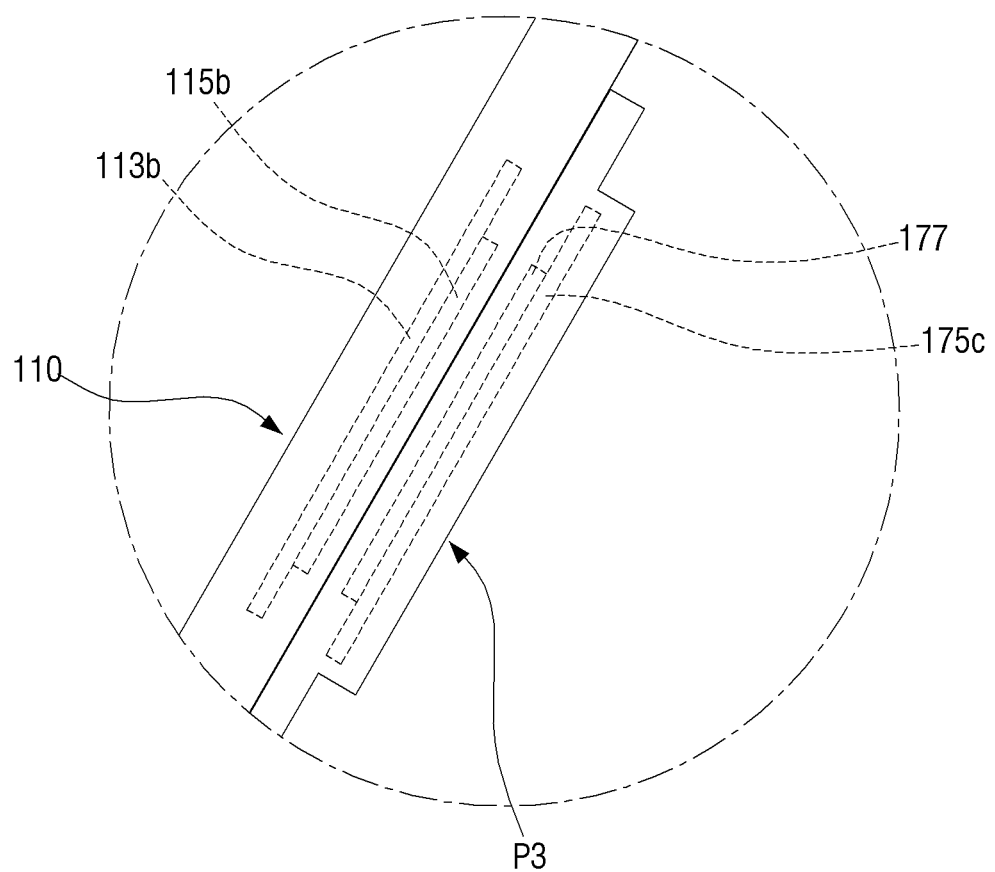
FIG. 12 is an enlarged view illustrating an XII portion of FIG. 10.

At this time, in the second usage mode of the stand apparatus 100 as illustrated in FIG. 12, the stand apparatus 100 has a stacking structure in which the plurality of the second magnets 115*b* are adjacent to the plurality of third magnets 177, and the second magnetic material 113*b* and the sixth magnetic material 175*c* are disposed in outer sides of the second and third magnets 115*b* and 177, respectively. The second and sixth magnetic materials 113*b* and 175*c* may function to expand action ranges of magnetic fields of the pluralities of second and third magnets 115*b* and 117, and as a result, attractive force generated between the pluralities of second and third magnets 115*b* and 177 and the second and sixth magnetic materials 113*b* and 175*c* may be increased. At this time, the pluralities of second and third magnets 115*b* and 177 are disposed so that different magnetic poles are located on facing surfaces thereof.

Therefore, the third section P3 of the supporter 170 may be attached to the outer surface of the cover part 110 with a large fixing force, and the supporter may stably support the cover part 110 which obliquely stands.

Referring to FIG. 13, the third usage mode of the stand apparatus 100 is a mode in which the keyboard part 130 is rotated to a second angle θ2 (about 300°) toward the outer surface of the cover part 110, and the key buttons 133 of the keyboard part 130 face the floor F.

The third usage mode may be applied when the keyboard part 130 is not used, and may be mostly applied when the user enjoys a moving image, a photo, or the like being displayed in the tablet 200, or when the user uses the tablet 200 to listen to music.

Since the length G of the central portion of the flexible hinge 150 is a condition in which an folding operation between the cover part 110 and the keyboard part 130 may be smoothly made, and simultaneously, the movement of the cover part 110 in the second usage mode may be minimized, the length G of the central portion of the flexible hinge 150 may be properly set by considering thicknesses of the cover part 110 and the keyboard part 130. The flexible hinge 150 manufactured as described above may allow the stand apparatus 100 to be smoothly changed from the first to third usage modes and allow the cover part 110 to stably support the stand apparatus 100 in the second and third usage modes.

Figure 14:
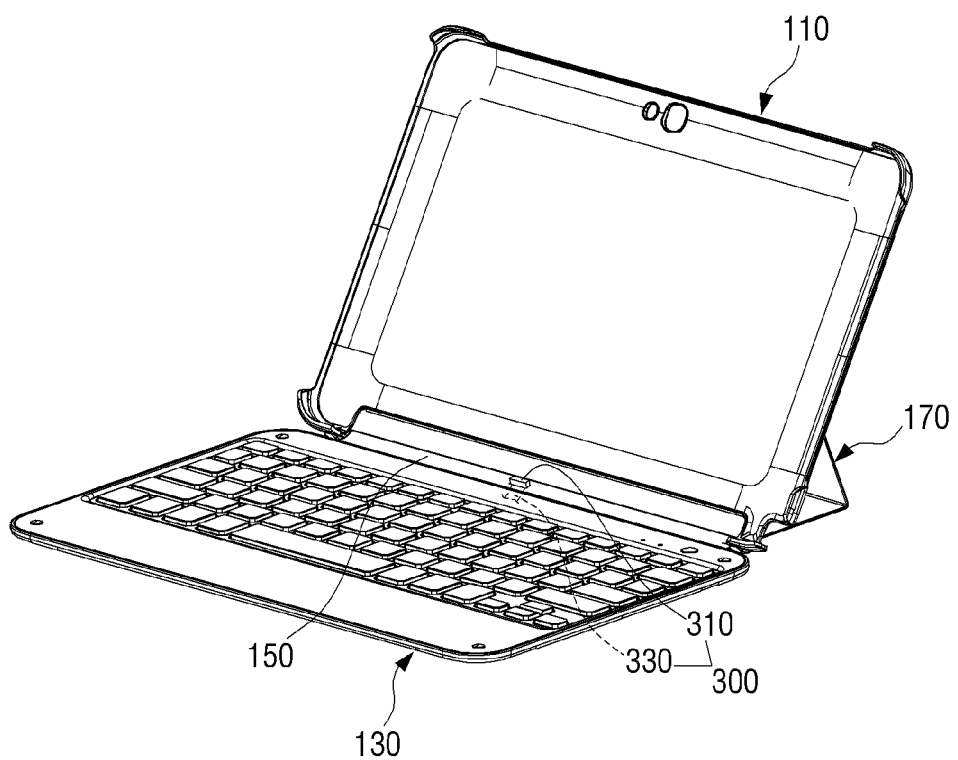
FIG. 14 is a perspective view illustrating an example in which an interface unit is added to a tablet stand apparatus according to an exemplary embodiment.

The tablet stand apparatus 100 according to the exemplary embodiment has exemplified that the keyboard part 130 communicates with the tablet 200 in a wireless manner, but the inventive concept is not limited thereto, and the keyboard part 130 may mutually communicate with the tablet 200 in a wired manner. To this end, as illustrated in FIG. 14, in the tablet stand apparatus 100, an interface unit 300 may be disposed in the flexible hinge.

The interface unit 300 includes a connection terminal 310 connected to a connection port (not shown) of the tablet 200, and the interface unit 300 includes a wiring part 330 configured to electrically connect the connection terminal 310 and the controller (not shown) of the keyboard part 130.

At this time, the wiring part 330 may be formed in a flexible printed circuit board (FPCB) to be disposed in an inner side of the hinge, and the connection terminal 310 may be disposed in one surface of the flexible hinge 150 in an exposed manner.

The interface unit 300 may be designed to supply a communication signal between the tablet 200 and the keyboard part 130 and supply power to the tablet 200 from the keyboard part 130.

Figure 15:
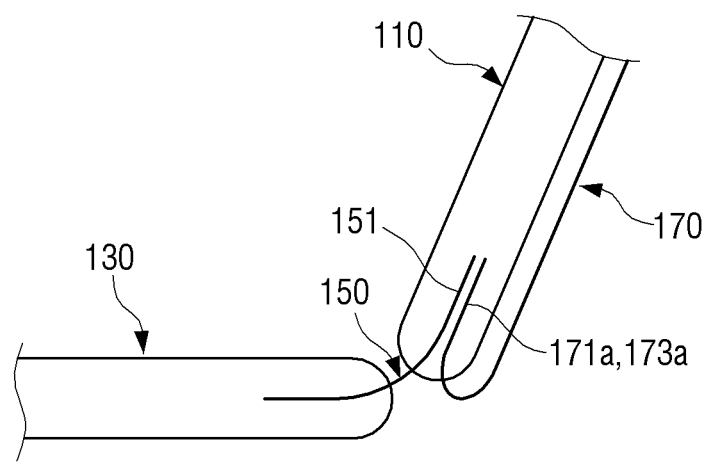
FIG. 15 is a schematic diagram illustrating an example in which one end portion of a supporter is fixed to a cover part.

The exemplary embodiment has described that the one end portions 171*a* and 173*a* of the supporter 170 are fixed to the keyboard part 130, but the inventive concept is not limited thereto. As illustrated in FIG. 15, the one end portions 171*a* and 173*a* of the supporter 170 may be fixed to the cover part 110. At this time, the first fixing member 117 may be ultrasonic-fused with the plurality of protrusions 111g of the hard case 111 passing through the one end portion 151 of the flexible hinge 150 and the one end portions 171a and 173a of the supporter 170 to fix the flexible hinge 150 and the supporter 170 to the cover part 110.

Figure 16:
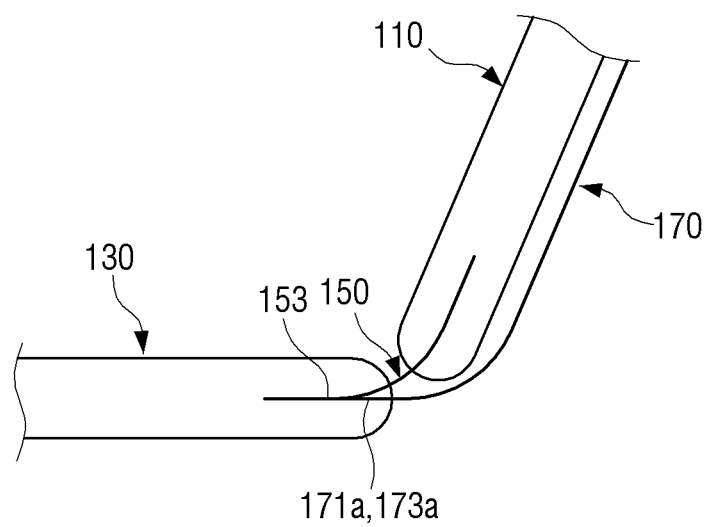
FIG. 16 is a schematic diagram illustrating an example in which one end portion of a supporter is fixed to a keyboard part by forming a flexible hinge to extend integrally to the one end portion of the supporter.
Figure 17:
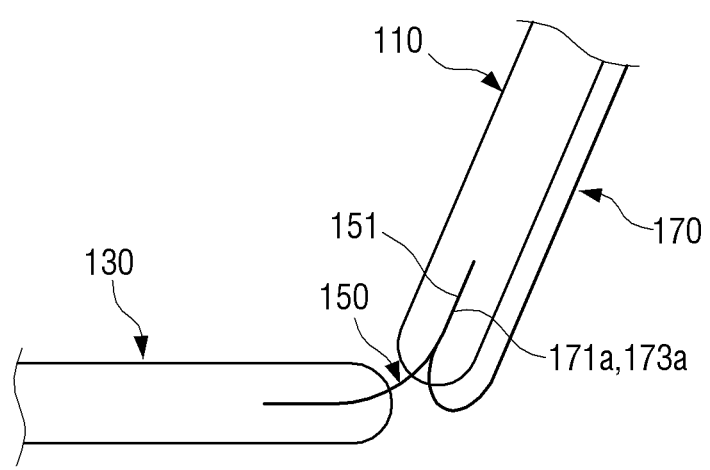
FIG. 17 is a schematic diagram illustrating an example in which one end portion of a supporter is fixed to a cover part by forming a flexible hinge to extend integrally to the one end portion of the supporter.

The flexible hinge 150 may be formed to extend to the one end portions 171a and 173a of the supporter 170 so that the flexible hinge 150 may be manufactured in one body with the supporter 170. As illustrated in FIG. 16, the other end portion 153 of the flexible hinge 150 may be fixed to the keyboard part 130 together with the one end portions 171a and 173a of the supporter 170. Alternatively, as illustrated in FIG. 17, the one end portion 151 of the flexible hinge 150 may be fixed to the cover part 110 together with the one end portions 171a and 173a of the supporter 170.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A tablet stand apparatus, comprising:
    a cover part attachable to and detachable from a tablet and including slip preventing members which are formed in an outer side of the cover part to prevent a movement of the cover part when the cover part stands at a preset angle;
    a keyboard part configured to receive a user command to control the tablet attached to the cover part;
    a flexible hinge of which one end portion is fixed to the cover part, and an other end portion is fixed to the keyboard part, to foldably interconnect the cover part and the keyboard part;
    a pressure part curved toward an inner side of the cover part and formed in a bottom portion of the cover part so that a portion of the cover part, which the one end portion of the flexible hinge is connected to by overlapping with the portion of the cover part, presses one side surface of the flexible hinge; and
    a supporter of which one end portion is connected to the keyboard part and configured to support the cover part to stand at a preset angle.

2. The tablet stand apparatus as claimed in claim 1, wherein the cover part presses the flexible hinge to form tension in the flexible hinge when the cover part stands at the preset angle.

3. The tablet stand apparatus as claimed in claim 1, wherein the cover part includes a first fixing member configured to fix the one end portion of the flexible hinge to the cover part.

4. The tablet stand apparatus as claimed in claim 3, wherein the first fixing member is fused with a plurality of protrusions of the cover part, which pass through the one end portion of the flexible hinge.

5. The tablet stand apparatus as claimed in claim 3, wherein an outer contour of the first fixing member is located in an inner side of an outer contour of the pressure part.

6. The tablet stand apparatus as claimed in claim 1, wherein the flexible hinge includes a flexible synthetic resin material.

7. The tablet stand apparatus as claimed in claim 1, wherein the one end portion of the supporter is fixed to the keyboard part.

8. The tablet stand apparatus as claimed in 7, wherein the other end portion of the flexible hinge is fixed to the keyboard part together with the one end portion of the supporter by a second fixing member.

9. The tablet stand apparatus as claimed in claim 7, wherein the other end portion of the flexible hinge extends to the one end portion of the supporter to be formed in one body with the supporter.

10. The tablet stand apparatus as claimed in claim 1, wherein the one end portion of the supporter is fixed to the cover part.

11. The tablet stand apparatus as claimed in claim 10, wherein the cover part includes a first fixing member configured to fix the one end portion of the flexible hinge to the cover part.

12. The tablet stand apparatus as claimed in claim 10, wherein the one end portion of the flexible hinge extends to the one end portion of the supporter to be formed in one body with the supporter.

13. The tablet stand apparatus as claimed in claim 1, wherein the supporter is detachably attached to an outer surface of the cover part by magnetic force.

14. The tablet stand apparatus as claimed in claim 13, wherein:
    the supporter includes first to third sections sequentially disposed from the one end portion thereof to an other end portion thereof and mutually bent,
    a plurality of magnets are disposed in the third section corresponding to the other end portion of the supporter among the first to third sections, and
    the cover part includes first to third magnetic materials disposed in locations corresponding to the first to third sections of the supporter.

15. The tablet stand apparatus as claimed in claim 14, wherein the third section includes a fourth magnetic material configured to reinforce magnetic force of the plurality of magnets.

16. The tablet stand apparatus as claimed in claim 14, wherein a plurality of magnets attached to the third magnetic material of the cover part and the plurality of magnets embedded in the third section of the supporter are disposed in locations corresponding to each other.

17. The tablet stand apparatus as claimed in claim 1, wherein the keyboard part includes a communication module configured to perform wireless communication with the tablet.

18. The tablet stand apparatus as claimed in claim 1, wherein the keyboard part includes an interface unit to which the tablet is connected in a wired manner.

19. The tablet stand apparatus as claimed in claim 18, wherein the interface unit includes a flexible wire extending from the keyboard part and disposed along an inner side of the flexible hinge, and a connection terminal connected to the flexible wire and disposed in an outer side of the flexible hinge.

* * * * *

UNITED STATES PATENT AND TRADEMARK OFFICE
CERTIFICATE OF CORRECTION

Page 1 of 1

PATENT NO. : 9,740,238 B2
APPLICATION NO. : 14/306796
DATED : August 22, 2017
INVENTOR(S) : Jae-uk Han It is certified that error appears in the above-identified patent and that said Letters Patent is hereby corrected as shown below:

In the Claims

Column 12, Line 7:
Claim 8, after "in" insert -- claim --.

Signed and Sealed this
Fourteenth Day of November, 2017

Joseph Matal
*Performing the Functions and Duties of the
Under Secretary of Commerce for Intellectual Property and
Director of the United States Patent and Trademark Office*